Nov. 15, 1927.

A. G. ENOCK 1,649,394

VALVE MECHANISM FOR COMPRESSORS

Filed Jan. 12, 1927 4 Sheets-Sheet 1

INVENTOR.
Arthur G. Enock.
by
Jowden O'Brien
attys.

Patented Nov. 15, 1927.

1,649,394

UNITED STATES PATENT OFFICE.

ARTHUR GUY ENOCK, OF WEMBLEY PARK, ENGLAND, ASSIGNOR TO BURLECTAS LIMITED, OF LONDON, ENGLAND.

VALVE MECHANISM FOR COMPRESSORS.

Application filed January 12, 1927, Serial No. 160,741, and in Great Britain January 23, 1926.

The invention relates to the construction and disposition of valves applicable for compressors for gas or air.

It is primarily intended to provide the maximum possible aperture between the valve and its seat to enable the incoming gas or air to pass into the cylinder of a compressor at the minimum possible velocity.

According to the invention an annular induction opening to the cylinder as large or nearly as large in diameter as the cylinder is formed around the cylinder end and the inlet or suction valve is constructed in the form of a sleeve inside which the piston reciprocates, one or both ends of the sleeve being formed with a flange or rim to close upon a valve seating formed around the cylinder edge or in the cylinder head.

The invention will be fully described with reference to the accompanying drawing.

The cylinder A is formed with annular inlet or suction passage B around the cylinder of greater diameter than the piston and a reciprocating sleeve valve D without ports fitted within the cylinder over the ends of which the gas or air flows on its way into the cylinder.

Figure 1:
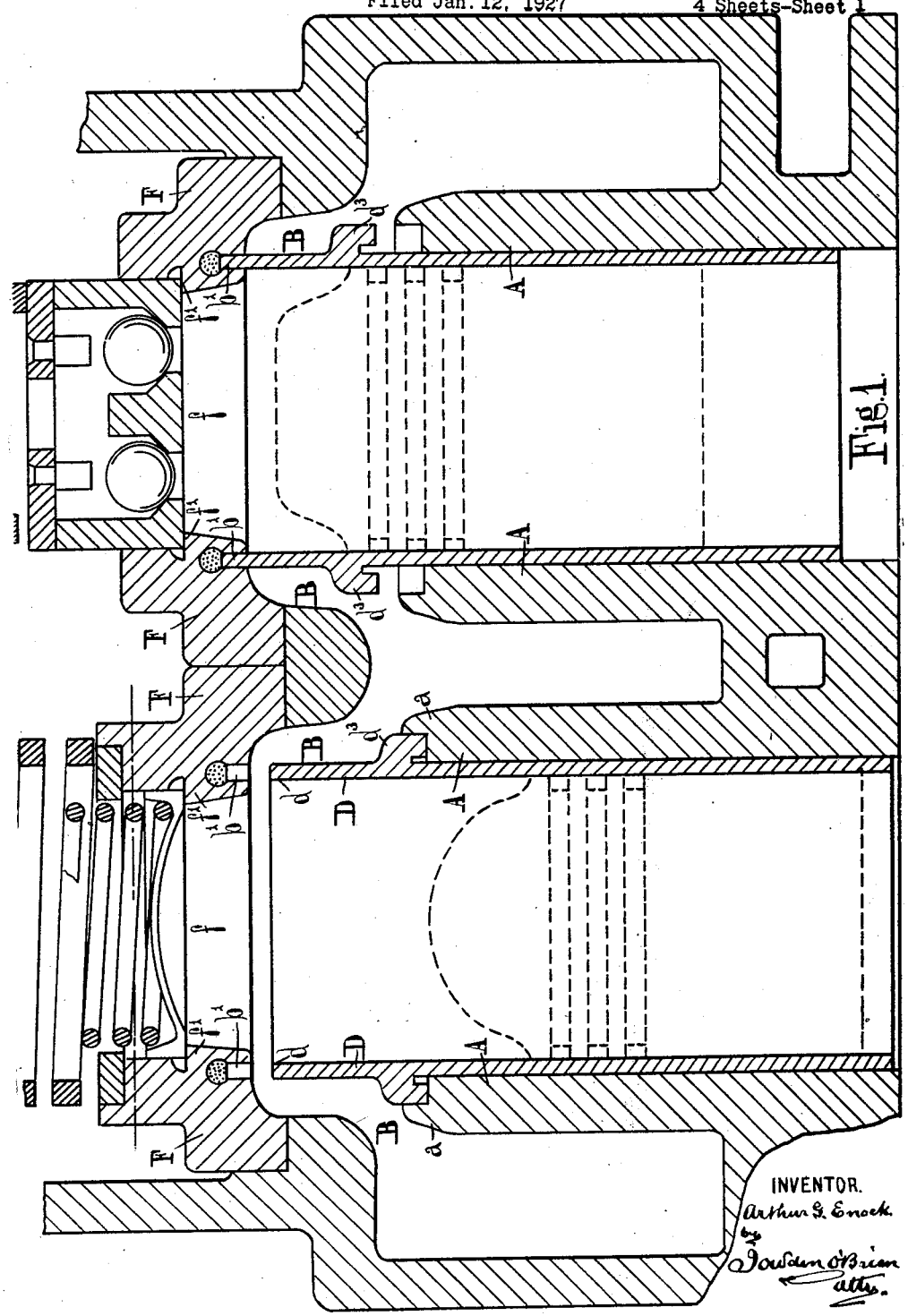
Fig. 1 is a sectional elevation through the cylinder of a gas or air compressor.

In the construction shown in Fig. 1 the annular inlet or suction passage B is formed around the cylinder end and an annular valve seating $b^1$ is machined out of the cylinder head and preferably provided with a suitable packing. The reciprocating sleeve valve D is formed with a rim or edge $d$ around its upper edge to close upon the seating $b^1$ and it is provided with stops $d^3$, to limit its movement in a downward direction. When the valve D is down the suction stroke of the piston draws the gas from the gas suction space B and on the return stroke of the piston the valve D is closed against its seat $b^1$ and the compressed gas is delivered through a delivery valve or valves. In order to provide the seating $b^1$ and at the same time to secure the maximum area for the delivery valves the cylinder head F is slightly tapered towards its outlet at $f$ and a shoulder $f^1$ provided upon which the delivery valve cage rests. This construction enables the whole of the delivery valve cage to act as a lifting head in case of liquid coming between the top of the piston and the underside of the delivery valve cage in which case the liquid would escape through the passages as well as through the delivery valves thus preventing damage from liquid hammer. For the higher ranges of speeds where minimum lift with maximum gas delivery passages is required I provide a type of light plate delivery valve domed to give strength, with a piston correspondingly domed to eliminate clearance on the compression stroke. The suction valve D is moved by the friction of the piston which would move it upward on the compression stroke, until the valve is closed against the seat $b^1$ and would open it downward on the suction stroke until the stop $d^3$ attached to the valve rests on the shoulder $a$. To prevent noise a cushioning space is provided wherein gas would be imprisoned and slightly compressed on the downward stroke of the valve. The plate delivery valve is made of thin sheet metal, domed to give it strength over its large area, with turned up edges to act as a guide and with valve cage forming the head of the compressor and containing the sleeve suction valve seating. In this head, spaces enable liquid to escape from the machine in case of liquid hammer. The delivery valve may comprise a number of steel balls mounted in a valve cage.

Figure 2:
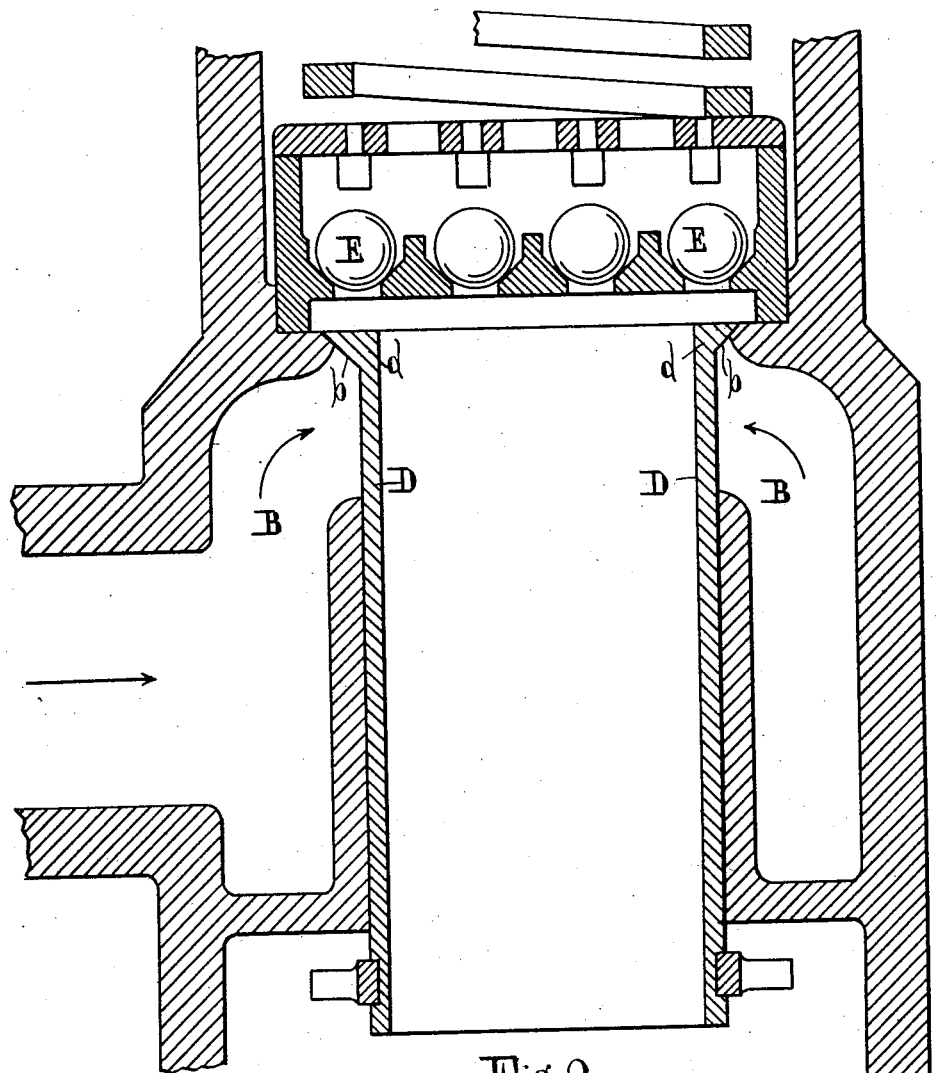
Figs. 2, 3 and 4 are similar sections showing the invention applied to other forms of cylinders.

In the construction shown in Fig. 2 the annular inlet or suction passage B is formed around the end of the cylinder A and an annular valve seating $b$ around the upper edge. The reciprocating sleeve valve D is formed with a flange $d$ around its upper rim to close on the seating $b$. The delivery valves E are ordinary ball or other valves. When the valve D is lowered the suction stroke of the piston draws the gas or air from the suction space B over the top of the valve into the cylinder and on the return stroke of the piston the valve D closes against its seat $b$ and the compressed gas or air is delivered through the delivery valves E.

Figure 3:
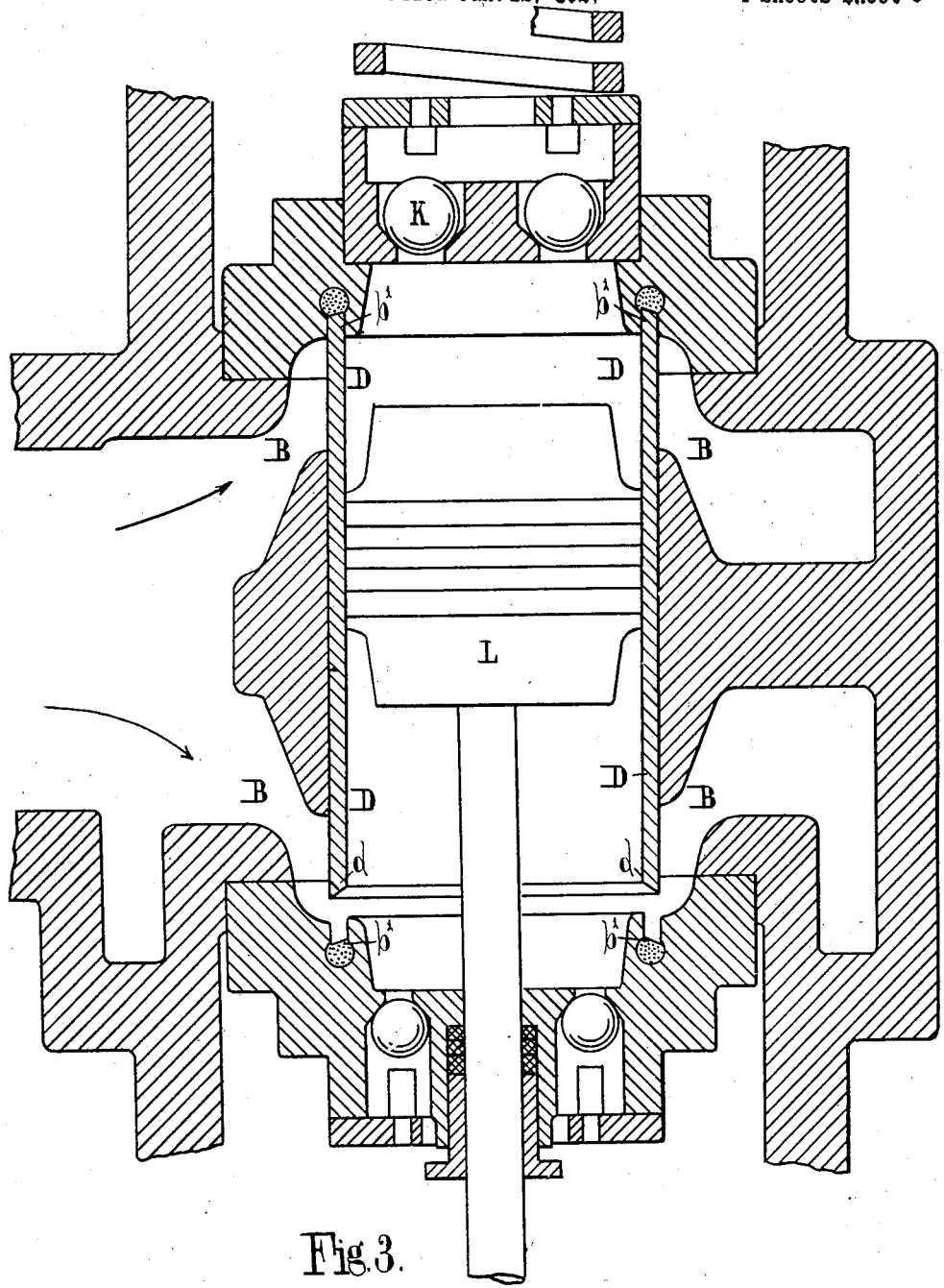

In the construction shown in Fig. 3 a double acting compressor is illustrated with an annular inlet or suction passage B around the cylinder at each end and an annular valve seating $b^1$ is machined out of the cylinder ends at each end (similar to Fig. 1). The reciprocating suction sleeve valve D is formed with a rim or edge $d$ around both ends to close upon the seatings $b^1$. The suction valve D is moved to and fro by the friction of the piston L and piston rings. The delivery valves K may be of ball or other known type. On the downward stroke of the piston L the valve D is closed against the seat at the bottom where it is kept during the compression stroke. In the meantime, the gas way at the upper end of the cylinder is opened and the piston is drawing in gas at the upper end. On the reversal of the stroke the valve D is closed against the seat at the top thus leaving the gas inlet open at the lower end of the cylinder and imprisoning the gas at the upper end of the cylinder during the compression stroke. The delivery valve cages may be supported and of the lifting type or may be formed integral with the suction sleeve valve seating.

Figure 4:
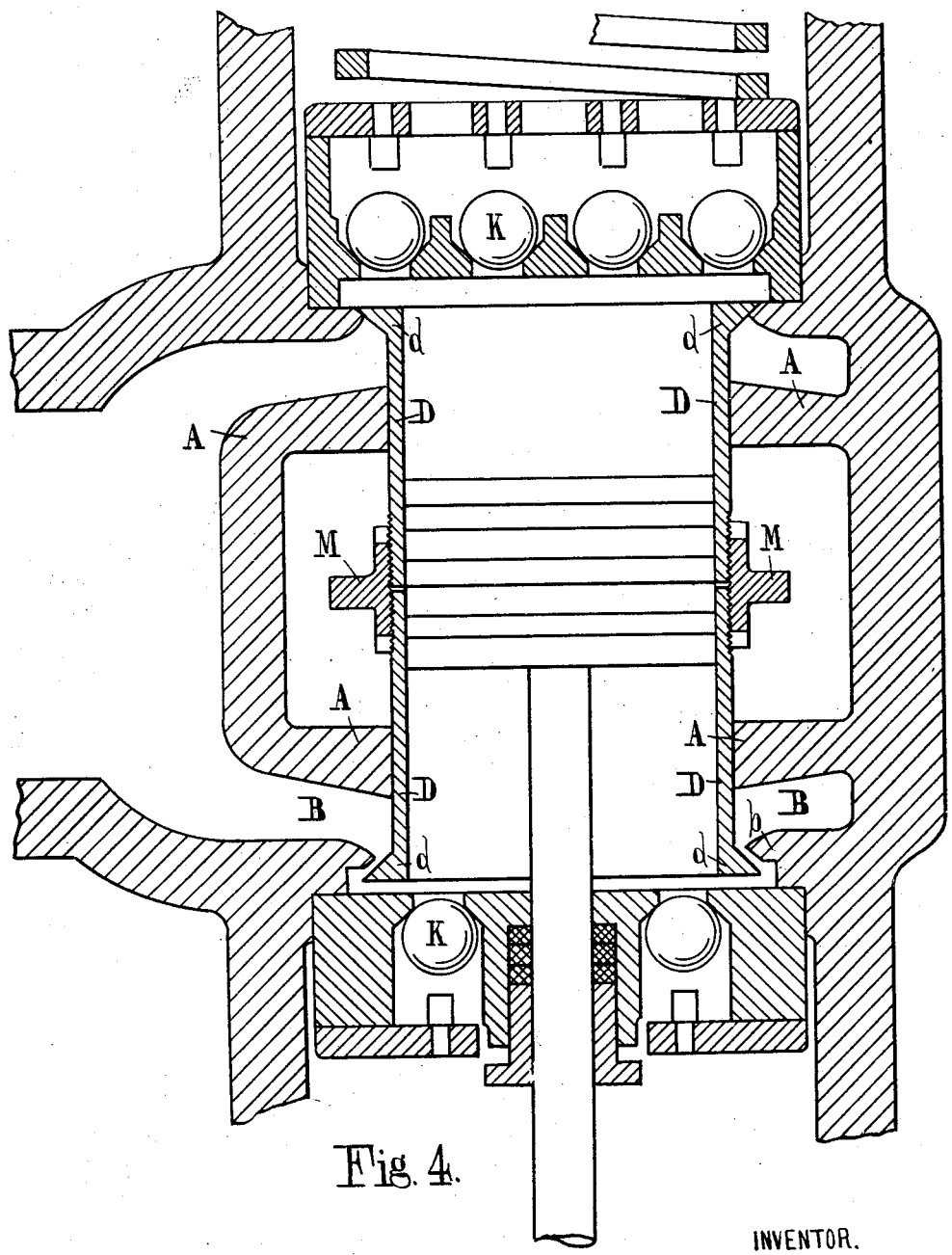

In the construction shown in Fig. 4 of a double acting gas or air compressor the cylinder is formed with an annular suction passage B around the cylinder A at each end and an annular valve seating $b$ around each end. The reciprocating suction sleeve valve D is formed with a flange $d$ around both ends to close upon the seatings $b$. The guides in which the valve D slides may be split when the valve is made in one piece or as shown, the valve may be divided transversely and connected together by a strap M screwed on or otherwise attached. The delivery valves K may be of ball or other known type. On the downward stroke of the piston L the valve D closes against the seat at the lower end where it is kept during the downward stroke. This lowering of the sleeve opens the gas way at the upper end of the cylinder and the piston draws in gas at the upper end. On the reversal of the stroke the valve D is closed against the seat at the top thus leaving the gas inlet open at the lower end of the cylinder and imprisoning the gas at the upper end of the cylinder during the compression stroke. The delivery valve cages may be supported and of the lifting type or may be formed integral with the suction sleeve valve seating.

To avoid friction between the sleeve valve D and the cylinder A annular grooves or recesses may be made in either or both.

In conjunction with the reciprocating sleeve inlet or suction valve D any type of exhaust or delivery valves may be employed such as ball, poppet or sleeve with or without lifting heads.

The compressor may be either vertical as shown or horizontal.

What I claim as my invention and desire to protect by Letters Patent is:—

1. In a compressor a cylinder, a piston reciprocating within the cylinder and a sleeve without ports, frictionally driven by the piston interposed between the piston and the cylinder, the cylinder wall being substantially shorter than the stroke of the piston to allow the sleeve to project therefrom at the upper end, an annular induction passage around the upper end of the cylinder of greater diameter than the piston to give an inlet opening of equal diameter thereto and an annular valve seating recessed into the cylinder head into which the sleeve enters to close the inlet to the space above the piston.

2. In a compressor a cylinder, a piston reciprocating within the cylinder and a sleeve without ports, frictionally driven by the piston interposed between the piston and the cylinder, the cylinder wall being substantially shorter than the stroke of the piston to allow the sleeve to project therefrom at the upper end, an annular induction passage around the upper end of the cylinder of greater diameter than the piston to give an inlet opening of equal diameter thereto, an annular valve seating recessed into the cylinder head into which the sleeve enters to close the inlet to the space above the piston stops on the cylinder wall to limit the movement of the sleeve in a downward direction, a cage inserted into the cylinder head and delivery valves in the cage by which the compressed fluid is exhausted.

In testimony whereof I have hereunto set my hand.

ARTHUR GUY ENOCK.